Figure 1:
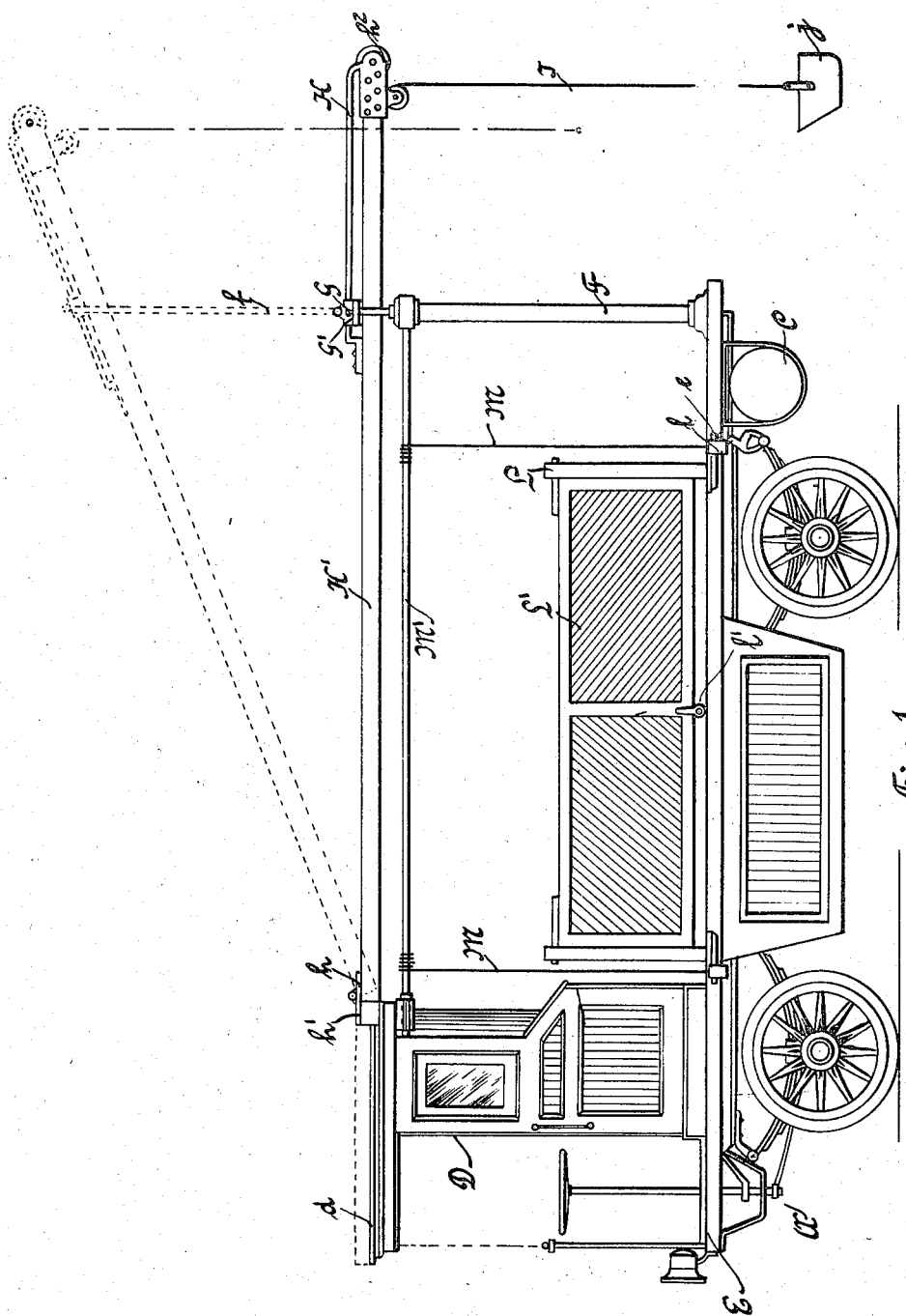

No. 840,489. PATENTED JAN. 8, 1907.
P. J. HEALEY.
AUTOMOBILE CRANE AND TIP CAR.
APPLICATION FILED JUNE 30, 1905.

3 SHEETS—SHEET 2.

WITNESSES:

INVENTOR:

By his Attorney

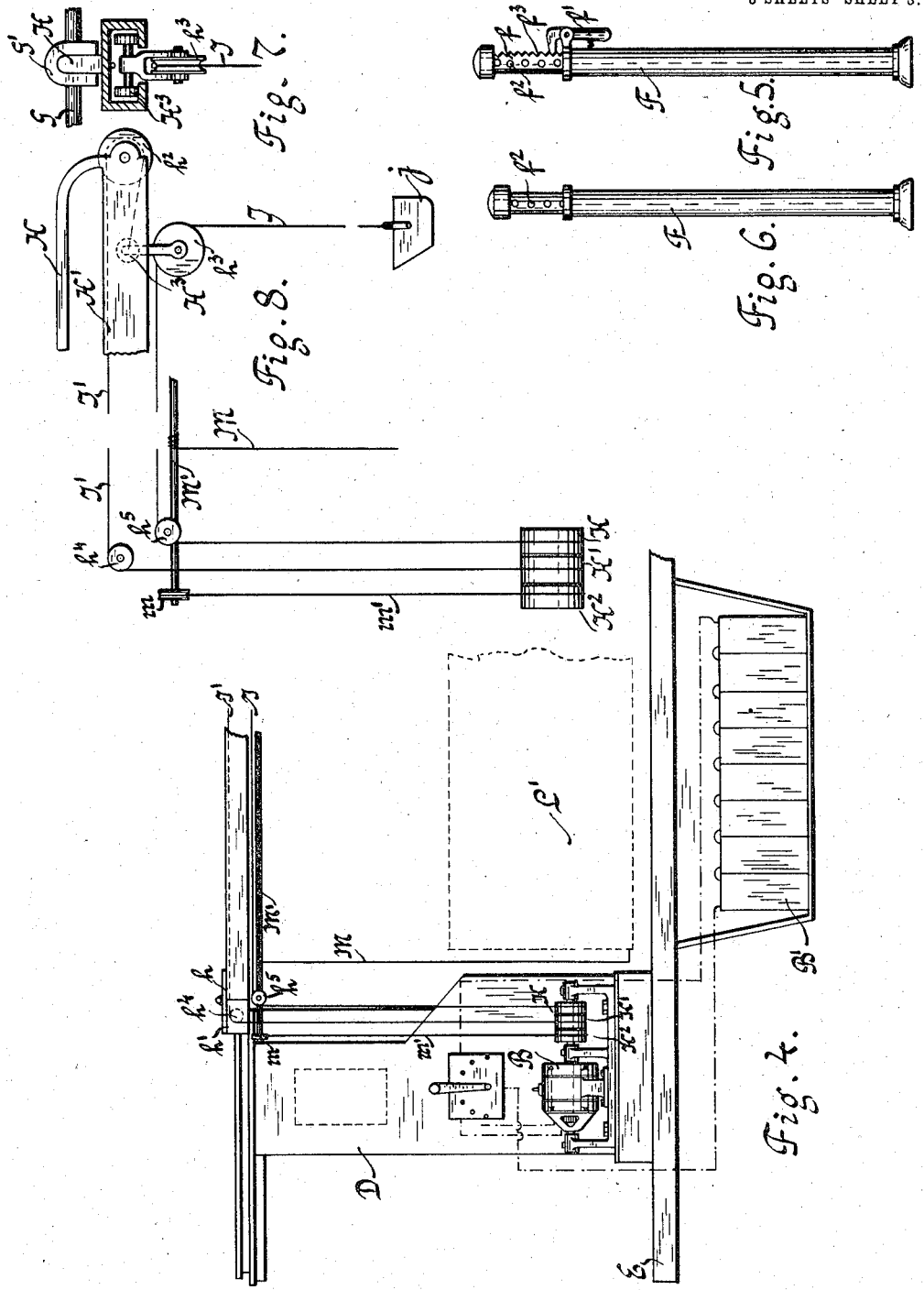

UNITED STATES PATENT OFFICE.

PATRICK J. HEALEY, OF BOSTON, MASSACHUSETTS.

AUTOMOBILE CRANE AND TIP-CAR.

No. 840,489.      Specification of Letters Patent.      Patented Jan. 8, 1907.

Application filed June 30, 1905. Serial No. 267,715.

*To all whom it may concern:*

Be it known that I, PATRICK J. HEALEY, a citizen of the United States of America, and a resident of Boston, in the county of Suffolk and State of Massachusetts, have invented a certain new and useful Automobile Crane and Tip-Car, of which the following is a specification, the same being a full, clear, and exact description of the invention, such as will enable others skilled in the art to which it appertains to make and use the same.

This invention relates to a machine for moving weights, having two motions, one a direct lift and the other a horizontal one, and also provided with means for discharging the said weight, and in particular to a self-impelled vehicle adapted to be used primarily for excavating purposes and in which the load is suspended from a carriage or carrier that travels along an arm jointed at one end to the vehicle, the said vehicle being also provided with a dumping-body pivoted to a platform mounted on a truck in order that the said body may be tipped or canted in order to discharge its load; and it has for its object the production of a vehicle of the class described which will be comparatively economical to manufacture and efficient and rapid in operation and durable in practical use.

With this object in view the invention consists in certain novel features of construction and arrangement of parts, all of which will be hereinafter described, and specifically pointed out in the drawings which accompany and form a part of this specification, and in which—

Figure 2:
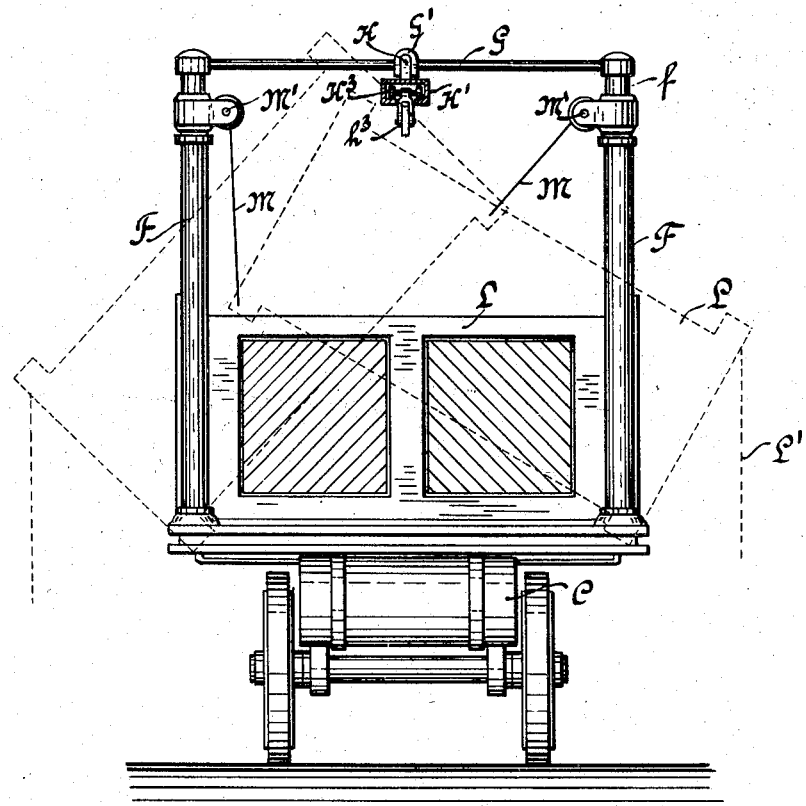
Figure 3:
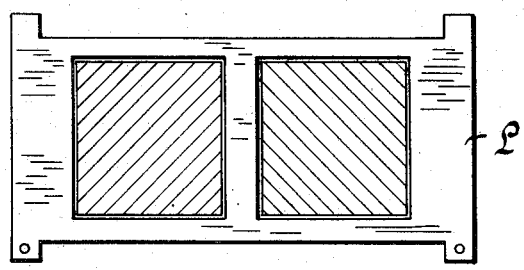

Figure 1 represents a side elevation of a vehicle embodying this invention. Fig. 2 is a rear elevation of the same. Fig. 3 is a view in detail of the body of the dumping-car. Fig. 4 is a view in detail, showing the interior of the cab. Fig. 5 is a view in elevation of the standard or pillar viewed from the interior of the vehicle. Fig. 6 is a similar view of a simplified form of construction of the same. Fig. 7 is an elevation of the carriage or carrier. Fig. 8 is a side view of the same.

Like letters of reference indicate like parts in all the views.

Referring particularly to the drawings, A denotes the truck or vehicle, which may consist of an ordinary automobile truck provided with suitable impelling means, as an electric motor B, and a source of power, as a storage battery B'. The truck also serves to carry a tank of compressed air C and is ordinarily constructed with a platform E, on which is placed a cab D, and upon the said platform is mounted two standards or pillars F, in the interior chambers or barrels of which are placed pistons of ordinary construction, the piston-rods $f$ of which extend upwardly and serve to support a cross-head G. A block or head G' is centrally mounted on the cross-head G and is constructed and arranged to form a bearing for the rod H, secured to the channeled arm H' and lying parallel with and a short distance above the same. The other end of the channeled arm H' is jointed at $h$ to a channeled slide-block $h'$, constructed and arranged to work back and forth on the track $d$, mounted on the top of the cab D.

By means of the above construction the end of the arm H' may be moved outwardly away from the vehicle or pushed inwardly toward the same at will, and the said arm may be also raised and lowered by respectively filling the tubes or barrels of the standards F with compressed air or allowing the latter to escape therefrom.

At the end of the channeled arm H' is mounted a sheave $h^2$, and in the channel of the said pivoted arm H' works a carriage or carrier H³, the sheave $h^3$ of which serves to support the rope J, carrying the bucket $j$, the said carriage being given a horizontal movement by means of the rope J', fastened to the same, which rope is passed over the sheave $h^2$ and then in a backward direction to the sheave $h^4$ and thence downward to and around the drum K' of a winch. The rope J, which supports the bucket $j$, passes over the sheave $h^3$ and then backward to the sleeve $h^5$ and thence downward to and around the drum K. By operating the said drums K and K' in the ordinary manner the following movements of the load may be secured: First, by causing the drum K' to rotate in one direction the carrier H³ will be caused to travel outward until it reaches the sheave $h^2$. Then by operating the drum K the bucket $j$ may be lowered, and, reversely, by causing the drum K to rotate in an opposite direction the bucket $j$ will be raised as high as the sheave $h^3$ will permit, whereupon a continued pull on the rope J will cause the bucket to be brought to the center of the vehicle, at which point it may be upset or discharged.

The dumping-body L is provided at each side with a pair of trunnions $l$, which normally rest in supports $e$, fixed to the sides of the platform E, to which trunnions are attached ropes M, a pair of which are wound on each side of the vehicle around a horizontal shaft M', carrying a pulley $m$, connected by a rope $m'$ with the drum $K^2$.

The parts are so arranged that by operating the drum $K^2$ the pulley $m$ will be caused to turn and one shaft M' will be rotated, thereby lifting up one side of the dumping-body L by means of the ropes M, and the door $l'$ on the opposite side of the dumping-body will thereupon swing outwardly on account of the tilting of the said dumping-body, the catch L' of the same having been previously unfastened. After the load has been discharged the dumping-body may be lowered again to its normal position. By the use of a similar contrivance the other side of the dumping-body may be raised to any angle required, thereby tipping or canting up the said body in order to discharge the contents of the same on the other side of the vehicle.

Each of the standards or pillars F may be provided with a spring-dog $f'$ to engage with a rack $f^3$ on the piston-rod $f$ contained therein, and the said rod $f$ may also have formed in the same a series of orifices $f^2$, by means of which the piston-rod $f$ may be kept at any height by the insertion of a pin in the particular orifice desired.

The frame of my apparatus, as stated, comprises a platform having upwardly-extending parts consisting of the cab at one end and the standards F at the other end, and the said upwardly-extending parts serve to support the crane or channeled arm H' and also the dumping-body L. The hoisting-rope J of the crane and the hoisting-rope M of the dumping-body are operated either independently or simultaneously by means of the common electric motor B.

I only claim in this application the invention embodied in the structure embracing the self-impelled vehicle provided with a common means for operating the hoisting-ropes, as the other features of the invention are claimed in my copending applications, Serial Nos. 295,208 and 295,209, filed January 8, 1906.

As it is evident that many changes in the construction, form, proportion, and relative arrangement of parts might be resorted to without departing from the spirit and scope of my invention, I would have it understood that I do not restrict myself to the particular construction and arrangement of parts shown and described, but that such changes and equivalents may be substituted therefor, and that

What I claim as my invention is—

1. A vehicle-truck, a platform therefor, a frame, a dumping device, a crane and a bucket, the frame being constructed and arranged to support the bucket carried by the crane and also the dumping device, in combination with a common means to move both the bucket and dumping device both up and down in a vertical direction and also in other directions.

2. A vehicle-truck, a platform therefor, a frame, a dumping device, a crane and a bucket, the frame being constructed and arranged to support the bucket carried by the crane and also the dumping device, in combination with a common means to move independently both the bucket and dumping device both up and down in a vertical direction and also in other directions.

In testimony of the foregoing specification I do hereby sign the same, in the city of Boston, county of Suffolk, and State of Massachusetts, this 31st day of May, 1905.

PATRICK J. HEALEY.

Witnesses:
F. A. FINNERTY,
LEONARD S. COYNE.